No. 798,570. PATENTED AUG. 29, 1905.
H. DALBY.
CORN POPPER.
APPLICATION FILED JAN. 21, 1905.
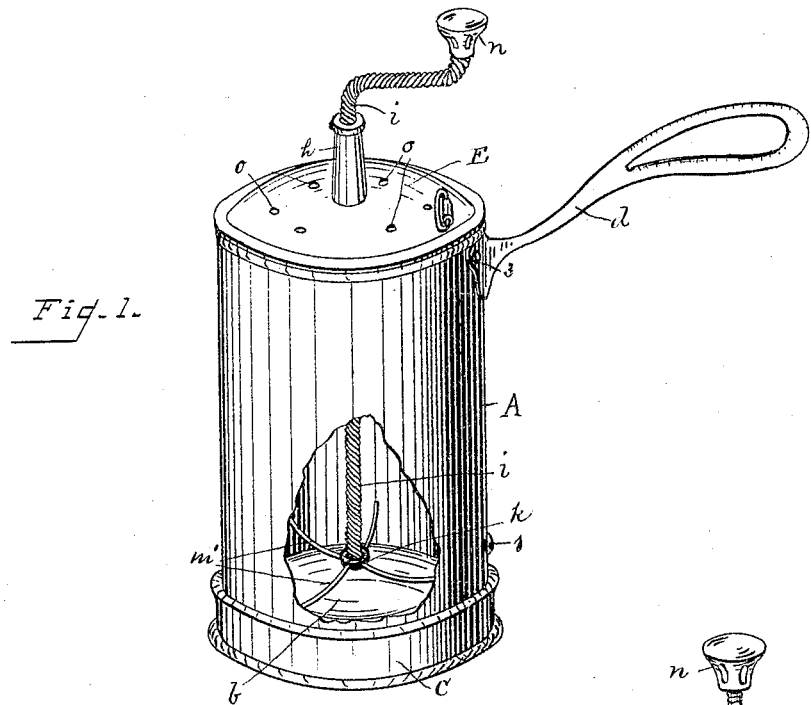
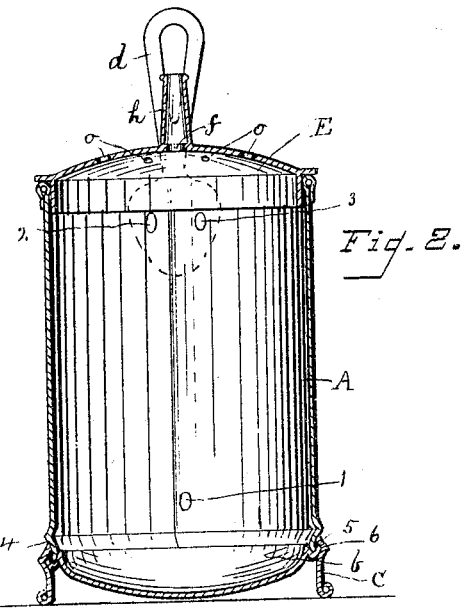
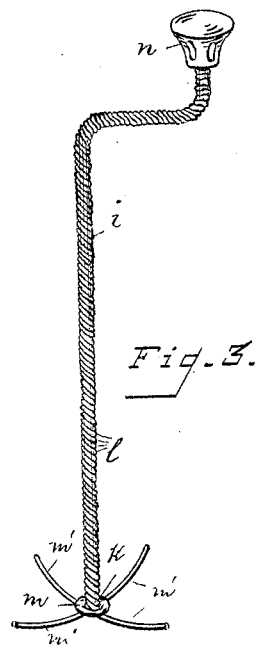
Witnesses
Francis M. Charles.
C. C. Wright.
Inventor
Harry Dalby
By H. N. Jenkins
Attorney

UNITED STATES PATENT OFFICE.

HARRY DALBY, OF GRAYVILLE, ILLINOIS.

CORN-POPPER.

No. 798,570.  Specification of Letters Patent.  Patented Aug. 29, 1905.

Application filed January 21, 1905. Serial No. 242,155.

*To all whom it may concern:*

Be it known that I, HARRY DALBY, a citizen of the United States, residing at Grayville, in the county of White and State of Illinois, have invented new and useful Improvements in Corn-Poppers, of which the following is a specification.

This invention relates to improvements in corn-popping apparatus; and it consists in the production of a cylindrical heating vessel having means for automatically separating the popped from the unpopped grain, lifting the former and allowing the latter to gravitate to the bottom or fire-heated surface of the vessel and in this way insure the explosion of all perfect grain in a rapid, cheap, and thoroughly efficient manner.

The nature of my invention is clearly shown in the accompanying drawings, whereon—

Figure 1 is perspective view of the apparatus complete, a portion of the cylindrical wall of the heating vessel being broken away in order to show the lower part of the agitator therein. Fig. 2 is a vertical transverse section of the heating vessel; and Fig. 3 is a perspective view of the agitator, its stem, and crank-handle, all of which are hereinafter fully described.

Referring again to the drawings, the letter A designates a cylindrical heating vessel having a concave bottom $b$ and a supporting base-band $c$, the lower edge of which is about on a line with the central part of the concave bottom, and a handle $d$, as in other heating vessels. The open top of the vessel A is provided with a removable cover E, having a central orifice $f$ and a sleeve or tube projecting upward therefrom, as at $h$, to serve as a guide or bearing for the vertical stem $i$ of an agitator $k$. The aforesaid agitator-stem is composed of a series of wires $l$, which are twisted or spirally wound and united near their lower ends by a band or ring $m$, from which point the wires are bent outwardly to follow the curve of the concave bottom of the heating vessel and be about equidistant from each other, as at $m'$. That part of the agitator-stem which projects above the cover is bent outwardly at or about a right angle to the main portion and provided with an upwardly-projecting handle, as shown at $n$, to permit of the agitator being raised, lowered, or rotated as occasion may require. To admit of a proper ventilation, the cover of the apparatus is provided with a series of perforations, as indicated at $o$.

In the operation of the invention a small quantity of lard, butter, sugar, or other selective material is put into the heating vessel and the latter placed over a furnace or other heater. When the selective material is sufficiently heated, the shelled corn is dropped into the vessel, and the cover, with its connected agitator, placed thereon. The popping of the corn increases its bulk, and thus tends to force the agitator upward, while at the same time an irregular revolving movement is imparted to the agitator by reason of the spirally-wound wires of its stem spasmodically contacting with the cover bearing or sleeve within which the stem operates. Thus the tendency is to loosen and separate the popped corn and allow the heavier unpopped grain to fall to the bottom of the vessel, where in turn it is popped and rendered edible. The heating vessel A is formed of sheet metal rolled into cylindrical form and having its ends united by overlapping in the usual manner, the overlapped portions being additionally secured by rivets 1 2 3, the two latter serving also as means for securing the handle $d$ to the vessel. The lower part of the aforesaid cylinder is outwardly grooved, as shown at 4, and the edge of the concave bottom $b$ is provided with a groove 5, into which the base of the cylinder is sprung. The upper edge of the base-band $c$ has an inner groove 6, which fits over the rim of the concave bottom and engages the outer groove of the cylinder A, thus forming additional means for holding the parts together, as shown in Fig. 2.

Having described my invention, what I claim as new, and desire to secure by Letters Patent, is—

1. In a corn-popper, the combination of a vertical cylindrical vessel provided with a cover having a central orifice and sleeve, an agitator composed of a series of wires, said wires spirally wound and united near their lower ends, the lower free ends being separated and bent outward, about equidistant, and the upper ends bent into crank-handle form, as set forth.

2. In a corn-popper, a cylindrical vessel having a concave bottom, an open top and a cover adapted to fit said top, the cover provided with ventilating-perforations and a central orifice having a sleeve projecting upward therefrom, an agitator composed of a series of wires spirally wound and united near their lower ends, the lower free ends bent outward to conform to the bottom of the vessel, and the upper ends of the wires formed into a crank and handle, as set forth.

In testimony whereof I have hereunto set my hand this 12th day of January, A. D. 1905.

HARRY DALBY.

Witnesses:
   E. P. BOWMAN,
   B. G. CRAWFORD.